(12) United States Patent  (10) Patent No.: US 9,160,483 B2
Akeboshi  (45) Date of Patent: Oct. 13, 2015

(54) SIGNAL TRANSMISSION DEVICE WITH DATA LENGTH CHANGER

(75) Inventor: Yoshihiro Akeboshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/128,864

(22) PCT Filed: Jul. 10, 2012

(86) PCT No.: PCT/JP2012/067569
§ 371 (c)(1),
(2), (4) Date: Dec. 23, 2013

(87) PCT Pub. No.: WO2013/027505
PCT Pub. Date: Feb. 28, 2013

(65) Prior Publication Data
US 2014/0119461 A1 May 1, 2014

(30) Foreign Application Priority Data
Aug. 25, 2011 (JP) ................................. 2011-183757

(51) Int. Cl.
H04B 15/00 (2006.01)
H04L 1/00 (2006.01)
(Continued)

(52) U.S. Cl.
CPC ............... *H04L 1/0007* (2013.01); *H04B 3/46* (2013.01); *H04L 1/0011* (2013.01); *H04L 1/20* (2013.01); *H04L 25/0276* (2013.01); *H04L 25/4902* (2013.01)

(58) Field of Classification Search
CPC . H04L 1/0007; H04L 1/0083; H04L 25/0276; H04L 1/0009; H04L 1/0011; H04B 3/46; H04B 1/1027

USPC .......... 375/257, 258, 285, 259; 714/817, 811, 714/799, 699; 340/12.34, 12.32, 12.31, 340/12.22, 12.15, 12.1, 1.1
See application file for complete search history.

(56) References Cited

U.S. PATENT DOCUMENTS 4,032,916 A * 6/1977 Galvin et al. ................. 340/508
5,276,765 A * 1/1994 Freeman et al. .............. 704/233
(Continued)

FOREIGN PATENT DOCUMENTS

JP 58 206262 12/1983
JP 59 208957 11/1984
(Continued)

OTHER PUBLICATIONS

Office Action issued Apr. 8, 2014 in Japanese Patent Application No. 2013-529927 with English language translation.
(Continued)

Primary Examiner — Chieh M Fan
Assistant Examiner — Michelle M Koeth
(74) Attorney, Agent, or Firm — Oblon, McClelland, Maier & Neustadt, L.L.P.

(57) ABSTRACT

A signal transmission device includes: a detector circuit that detects impulse noises having been applied to the transmission line, the detector circuit being composed of an analog circuit; a noise counter that counts the impulse noises detected by the detector circuit and observes occurrence intervals of the impulse noises; and a data length changer that varies a data length of the communication frames depending on the occurrence intervals of the impulse noises observed by the noise counter.

6 Claims, 4 Drawing Sheets

(51) Int. Cl.
*H04L 1/20* (2006.01)
*H04L 25/02* (2006.01)
*H04L 25/49* (2006.01)
*H04B 3/46* (2015.01)
*G06F 11/00* (2006.01)

(56) References Cited

U.S. PATENT DOCUMENTS

| | | | |
|---|---|---|---|
| 6,940,973 B1 * | 9/2005 | Yeap et al. | 379/416 |
| 7,809,076 B1 | 10/2010 | Ghobrial et al. | |
| 8,194,722 B2 * | 6/2012 | Norrell et al. | 375/222 |
| 2009/0045902 A1 * | 2/2009 | Hirai | 336/192 |
| 2009/0323903 A1 | 12/2009 | Cioffi et al. | |
| 2010/0115374 A1 | 5/2010 | Kirkby | |
| 2010/0220771 A1 | 9/2010 | Tzannes | |
| 2011/0084730 A1 * | 4/2011 | Suzuki et al. | 326/82 |

FOREIGN PATENT DOCUMENTS

| | | | | |
|---|---|---|---|---|
| JP | 61 72431 | 4/1986 | | |
| JP | 61 123227 | 6/1986 | | |
| JP | 63 67040 | 3/1988 | | |
| JP | 64 74842 | 3/1989 | | |
| JP | 6 46101 | 2/1994 | | |
| JP | 8-115820 A | * | 5/1996 | H01F 17/06 |
| JP | 9 162929 | 6/1997 | | |
| JP | 2003 46655 | 2/2003 | | |
| JP | 2007 158976 | 6/2007 | | |
| JP | 2008 10948 | 1/2008 | | |
| JP | 2010 118893 | 5/2010 | | |
| JP | 2010 154028 | 7/2010 | | |

OTHER PUBLICATIONS

International Search Report Issued Aug. 7, 2012 in PCT/JP12/067569 Filed Jul. 10, 2012.
Search Report issued Apr. 16, 2015 in European Patent Application No. 12826485.0 (in English).

* cited by examiner

SIGNAL TRANSMISSION DEVICE WITH DATA LENGTH CHANGER

TECHNICAL FIELD

The present invention relates to a signal transmission device being capable of optionally setting data length of communication frames and capable of reducing characteristic degradation caused by noises to a minimum when impulse noises are applied to a transmission line.

BACKGROUND ART

During a data communication between signal transmission devices in a communication system, if an impulse noise is applied to a transmission line (or a transmission cable) at the time when a communication frame is outputted, frame loss occurs in the communication frame, and thus degrading transmission efficiency.

As an example, in Ethernet, a user can set the data length of communication frames to optional length. In such a communication system, if communication is performed with the data length of communication frames set to be long, transmission efficiency degradation for when frame loss occurs due to an impulse noise becomes noticeable and brings disadvantages.

Contrary to above, if communication is performed with the data length set to be very short, transmission efficiency degradation due to impulse noises may decrease. However, transmission efficiency degrades due to the overhead of control fields such as frame headers, and thus being disadvantageous.

In general, in a communication system that performs signal transmission with impulse noises, there is an intermediate data length being capable of achieving the best transmission efficiency. This data length of the best transmission efficiency depends on the occurrence intervals of impulse noises.

Here, as shown in FIG. 4, a communication frame 4 is composed of bit fields including a preamble & header 41, data 42, and an FCS (Frame Check Sequence) 43. A user can optionally set the length of the data 42. It is assumed that the frequency of occurrence of an impulse noise 5 is distributed randomly around a certain average interval, and frame loss occurs in a communication frame 4 outputted at a time when overlapping with an impulse noise 5. Note that numeral 44 denotes a frame gap between communication frames 4.

FIG. 5 shows an example of results of studying, by numerical analysis, the data length being capable of achieving the best transmission efficiency when communication frames 4 shown in FIG. 4 are used. The horizontal axis of FIG. 5 represents the data length of communication frames 4 and the vertical axis represents effective transmission efficiency. Note that the communication rate is assumed to be 125 Mbps, and the frequencies of occurrence of an impulse noise 5 are 40 µs, 80 µs, and 160 µs.

In the analysis results shown in FIG. 5, the best transmission efficiency is achieved in the case of intermediate data lengths of 200 to 300 bytes (region A). Note that, in a portion where the data length is long (region B), the transmission efficiency decreases due to the application of impulse noises 5. In addition, in a portion where the data length is very short (region C), the transmission efficiency decreases due to the overhead of control fields such as headers.

Based on relations such as that described above, in order to improve the transmission efficiency, techniques for optimally setting the data length are disclosed (See Patent Literatures 1 and 2, for example). In these conventional techniques, as shown in FIG. 6, a detecting unit 100 detects a frame error by using an FCS 43 provided to a communication frame 4, and a data length changer 101 varies the data length to an optimal length based on the detection result.

CITATION LIST

Patent Literature 1: JP 61-72431 A
Patent Literature 2: JP 6-46101 A

SUMMARY OF INVENTION

In the conventional techniques disclosed in the Patent Literatures 1 and 2, an FCS 43 is used for detecting a frame error. However, there is a problem in this conventional techniques that it cannot be determined whether an impulse noise 5 applied to a transmission line 102 actually causes the error.

In addition, there is another problem that a temporal resolution of occurrence intervals of impulse noises 5 cannot be made better than frame length time because the bit field of the FCS 43 provided to a communication frame 4 is monitored.

The present invention is made to solve problems such as those described above, and an object of the present invention is to provide a signal transmission device capable of setting more accurate and optimal data length by accurately detecting impulse noises applied to a transmission line and improving the temporal resolution of occurrence intervals of impulse noises.

A signal transmission device according to the present invention includes: a mode separator circuit that separates a transmission signal transmitted from the transmission line into differential mode components and common mode components; a detector circuit that detects, from the common mode components of the transmission signal separated by the mode separator circuit, impulse noises having been applied to the transmission line, the detector circuit being composed of an analog circuit; a noise counter that counts the impulse noises detected by the detector circuit and observes occurrence intervals of the impulse noises; and a data length changer that varies a data length of the communication frames depending on the occurrence intervals of the impulse noises observed by the noise counter.

According to the present invention, since the signal transmission device is configured in the above-described manner, impulse noises applied to the transmission line can be accurately detected and the temporal resolution of intervals between occurrences of the impulse noises can be improved, and thus enabling to perform the setting of more accurate and optimal data length.

DESCRIPTION OF EMBODIMENTS

An embodiment of the present invention will be described in detail below with reference to the drawings.

Embodiment 1

Figure 1:
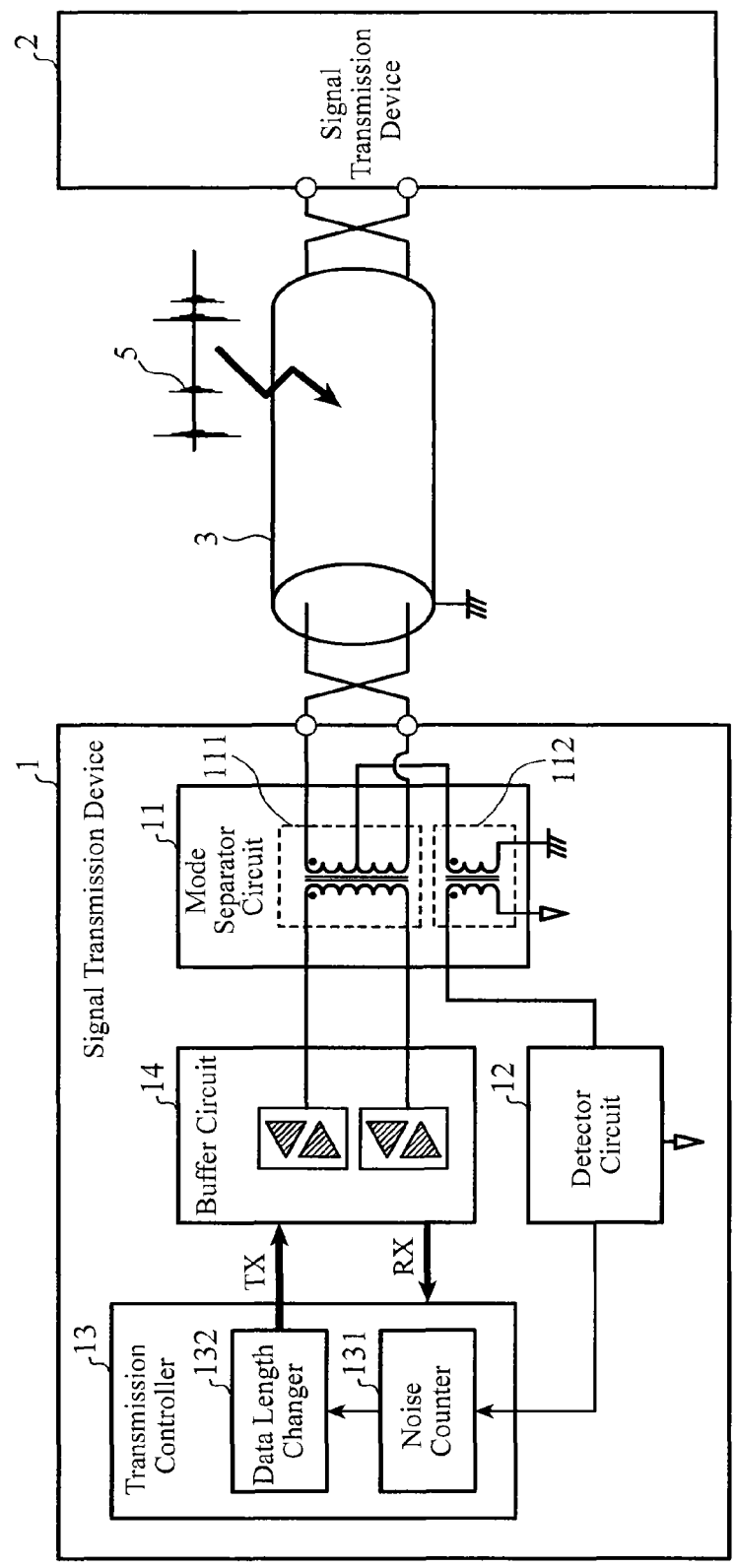
FIG. 1 is a diagram representing a configuration of a communication system according to Embodiment 1 of the present invention.

FIG. 1 is a diagram representing a configuration of a communication system according to Embodiment 1 of the present invention.

As shown in FIG. 1, the communication system comprises signal transmission devices 1 and 2 that transmit and receive communication frames 4 to/from each other, and a transmission line (differential transmission cable) 3 that connects between the signal transmission devices 1 and 2.

Although in the following only the internal configuration of the signal transmission device 1 will be described, the signal transmission device 2 is configured in the same manner.

The signal transmission device 1 comprises a mode separator circuit 11, a detector circuit 12, a transmission controller 13 and a buffer circuit 14.

The mode separator circuit 11 separates a transmission signal (or a differential signal) transmitted from the transmission line 3 into differential mode components and common mode components, and thereby separates impulse noises 5 from communication frames 4.

The communication frames 4 input to the mode separator circuit 11 from the transmission line 3 are the differential mode components of the differential signal, and are transmitted to the transmission controller 13 through the buffer circuit 14. The impulse noises 5 applied to the transmission line 3 are input as the common mode components to the mode separator circuit 11. Hence, the impulse noises 5 are separated from the communication frames 4 by the mode separator circuit 11 and then transmitted to the detector circuit 12.

As an example of a specific circuit configuration of the mode separator circuit 11, FIG. 1 shows the case of using two transformer elements (i.e. the signal transformer 111 and the noise detection transformer 112).

On the transmission line 3 side of the signal transformer 111 are connected to a pair of differential cable signals. On the device 1's inner side of the signal transformer 111, the pair signals are connected to the buffer circuit 14. By the signal transformer 111 configured in this manner, differential mode components are extracted from the transmission signal.

On the transmission line 3 side of the noise detection transformer 112 are connected to a midpoint of the signal transformer 111 and a shield of the cable. On the device 1's inner side of the noise detection transformer 112 are connected to a signal to be input to the detector circuit 12 and SG (circuit internal GND). By the noise detection transformer 112 configured in this manner, common mode components are extracted from the transmission signal.

Figure 4:
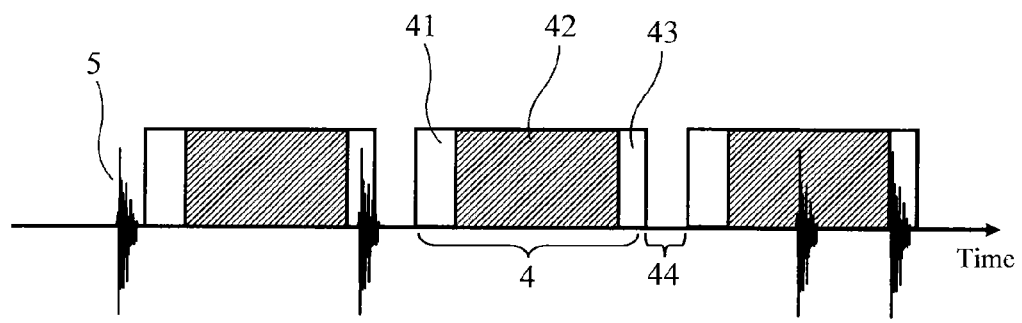
FIG. 4 is a diagram representing communication frames and the temporal wavelength of impulse noises in Embodiment 1 of the present invention.
Figure 5:
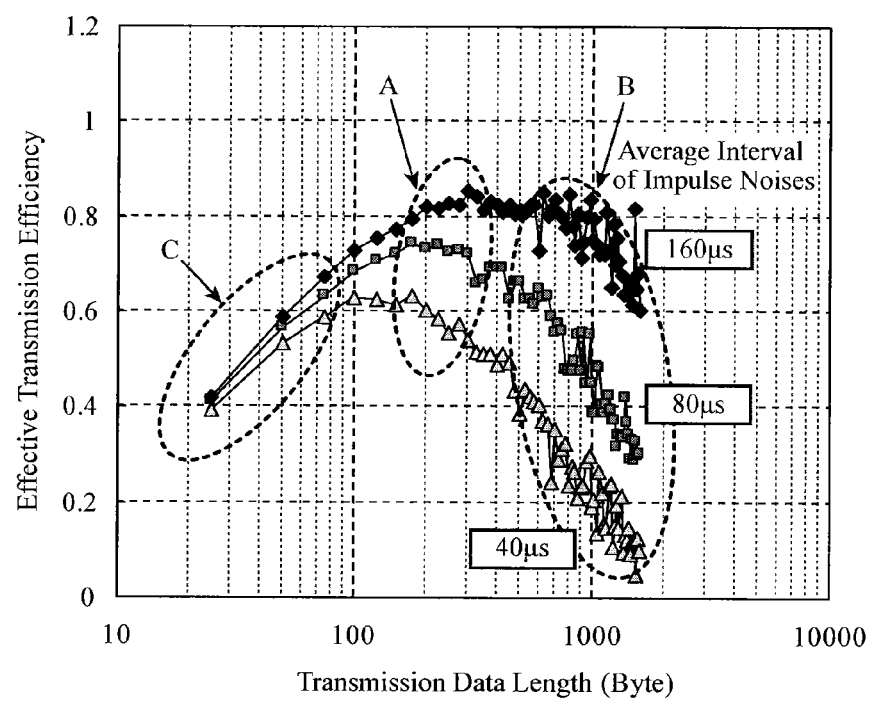
FIG. 5 is a diagram representing the relationship between effective transmission efficiency and data length in Embodiment 1 of the present invention.
Figure 6:
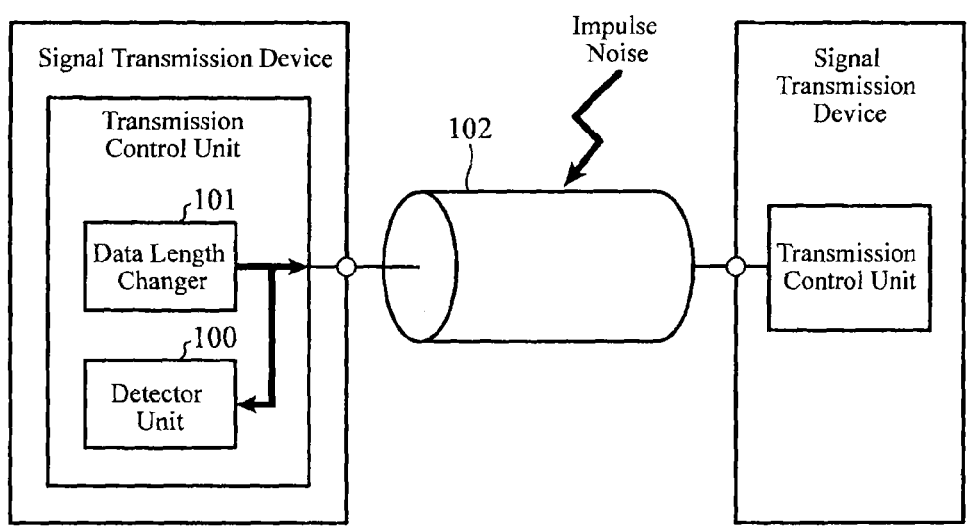
FIG. 6 is a diagram representing a configuration of a conventional communication system.

The detector circuit 12 receives the common mode components of the transmission signal separated by the mode separator circuit 11, and detects the impulse noises 5. The detector circuit 12 is composed of an analog circuit. Here, as shown in FIGS. 1 and 4, the impulse noises 5 have a characteristic waveform including high instantaneous peaks. By performing a noise detection using the detector circuit 12 having sensitivity to this instantaneous peak voltage, the accuracy of temporal resolution can be improved, and thus enabling to perform accurate noise detection.

Figure 2:
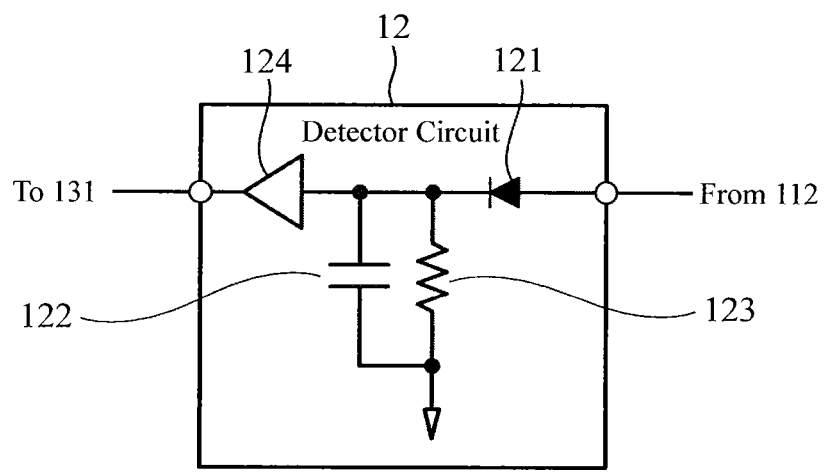
FIG. 2 is a diagram representing an internal configuration of a detector circuit in Embodiment 1 of the present invention.

An example of a specific circuit configuration of the detector circuit 12 is shown in FIG. 2. The detector circuit 12 is configured to detect an instantaneous peak voltage of the impulse noise 5 through a diode 121 and a capacitor 122. The diode 121 is connected at its anode terminal to the noise detection transformer 112. The capacitor 122 is connected between a cathode terminal of the diode 121 and the SG Note that a resistor 123 connected between the cathode terminal of the diode 121 and the SG is a discharge resistor for the capacitor 122. An operational amplifier 124 amplifies the detected voltage.

The transmission controller 13 controls the transmission and reception of communication frames 4, which is performed with the signal transmission device 2. The transmission controller 13 is provided with a noise counter 131 and a data length changer 132.

The noise counter 131 counts the impulse noises 5 detected by the detector circuit 12 to observe intervals between occurrences of the impulse noises 5.

In order to perform communication in a condition with the best transmission efficiency, the data length changer 132 varies the data length of communication frames 4 depending on the intervals between occurrences of the impulse noises 5 which are observed by the noise counter 131. When the average interval between occurrences of the impulse noises 5 is short, the data length changer 132 reduces the data length. Contrary to this, when the average interval between occurrences of the impulse noises 5 is long, the data length changer 132 increases the data length.

The communication operation performed by the signal transmission device 1 configured in the above-described manner will be described with referring to FIG. 3.

Note that, as shown in FIG. 4, a communication frame 4 is composed of bit fields of a preamble & header 41, data 42, and an FCS 43. The length of the bit field of the data 42 can be varied to any length by a user during data communication. It is assumed that impulse noises 5 characterized by a strong instantaneous peak are randomly applied to the transmission line 3 with a probability having a certain average time interval.

Figure 3:
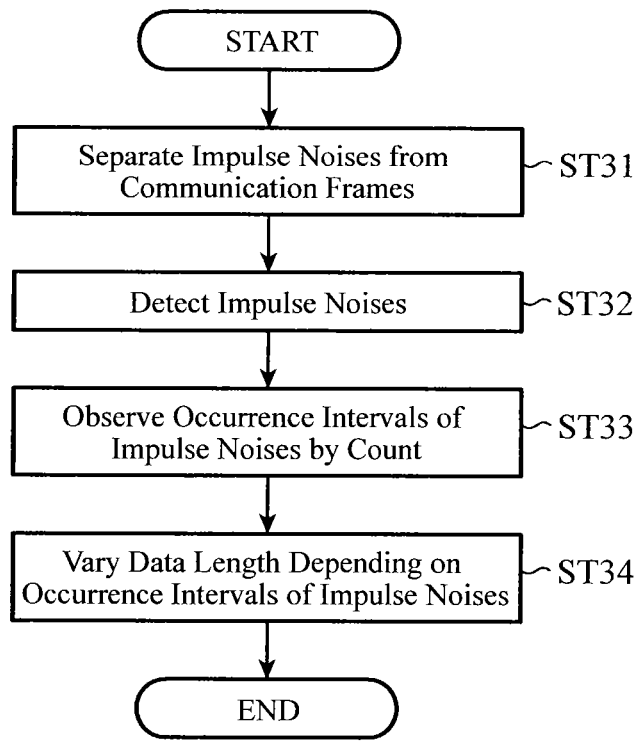
FIG. 3 is a flowchart representing communication operation performed by a signal transmission device according to Embodiment 1 of the present invention.

As shown in FIG. 3, in communication performed by the signal transmission device 1, the mode separator circuit 11 separates a transmission signal transmitted from the transmission line 3 into differential mode components and common mode components to separates impulse noises 5 from communication frames 4 (step ST31). The differential mode components (i.e. communication frames 4) of the transmission signal having been separated by the mode separator circuit 11 are transmitted to the transmission controller 13 through the buffer circuit 14 and then processed in a normal manner. On the other hand, the common mode components (i.e. impulse noises 5) of the transmission signal are transmitted to the detector circuit 12.

The detector circuit 12 receives the common mode components of the transmission signal, which have been separated by the mode separator circuit 11, to detect the impulse noises 5 (step ST32). On detecting the impulse noises 5, since the detector circuit 12 composed of an analog circuit is used instead of monitoring FCSs 43 like the conventional case, the temporal resolution of intervals between occurrences of the impulse noises 5 can be improved, and thus enabling to perform noise detection with higher accuracy.

Subsequently, the noise counter 131 counts the impulse noises 5 detected by the detector circuit 12 to observes intervals between occurrences of the impulse noises 5 (step ST33).

The data length changer 132 varies the data length depending on the occurrence intervals of the impulse noises 5 observed by the noise counter 131 (step ST34). More specifically, when the average interval between occurrences of the impulse noises 5 is short, the data length changer 132 reduces the data length. On the other hand, when the average interval between occurrences of the impulse noises 5 is long, the data length changer 132 sets the data length to be long. Thereafter, the transmission controller 13 generates communication frames 4 with the data length set by the data length changer 132, and transmits the communication frames 4 to the signal transmission device 2.

As described above, according to the Embodiment 1, it is configured such that in noise detection the detector circuit 12 composed of an analog circuit is used instead of monitoring FCSs 43 provided to communication frames 4. Therefore, impulse noises 5 applied to the transmission line 3 can be accurately detected, the temporal resolution of intervals between occurrences of the impulse noises 5 can be improved, and thus enabling to perform the setting of a more accurate optimal data length. In addition, the detector circuit 12 is a voltage peak detection type circuit having high sensitivity to a peak voltage of an impulse noise, and thus, detection sensitivity can be further improved. Furthermore, it is configured such that the mode separator circuit 11 is provided to input only common mode components contained in a transmission signal from the transmission line 3, to the detector circuit 12. Thus, sensitivity to noise detection can be further improved.

Note that, in the invention of the present application, modifications or omissions of any component in the embodiment as would fall within the scope of the present invention may be made.

INDUSTRIAL APPLICABILITY

A signal transmission device according to the present invention includes: a detector circuit that detects impulse noises having been applied to the transmission line, the detector circuit being composed of an analog circuit; a noise counter that counts the impulse noises detected by the detector circuit and observes occurrence intervals of the impulse noises; and a data length changer that varies a data length of the communication frames depending on the occurrence intervals of the impulse noises observed by the noise counter. Hence, impulse noises applied to the transmission line can be accurately detected and thus the temporal resolution of intervals between occurrences of the impulse noises can be improved, enabling to perform the setting of a more accurate optimal data length. Accordingly, the signal transmission device capable of setting the data length of communication frames to any length is suitable for use in reducing characteristic degradation caused by noises to a minimum when impulse noises are applied to the transmission line.

The invention claimed is:

1. A signal transmission device that transmits and receives communication frames to/from a partner device through a transmission line, each of the communication frames having a header bit field, a data bit field, and a frame check sequence (FCS) bit field, the signal transmission device comprising:
    a mode separator circuit that separates a transmission signal transmitted from the transmission line into differential mode components and common mode components;
    an analog detector circuit that detects in real-time, from the common mode components of the transmission signal separated by the mode separator circuit, impulse noises having been applied to the transmission line;
    a noise counter that counts the impulse noises detected by the detector circuit and observes occurrence intervals of the impulse noises; and
    a data length changer that varies a length of the data bit field in the communication frames in proportion to a duration of the occurrence intervals of the impulse noises observed by the noise counter.

2. The signal transmission device according to claim 1, wherein the detector circuit is a peak detection type circuit having sensitivity to instantaneous peak voltages of the impulse noises.

3. The signal transmission device according to claim 1, wherein the mode separator circuit includes:
    a signal transformer that extracts the differential mode components from the transmission signal; and
    a noise detection transformer that extracts the common mode components from the transmission signal.

4. The signal transmission device according to claim 1, wherein the data length changer reduces the length of the data bit field in the communication frames as the duration of the occurrence intervals of the impulse noises is smaller.

5. The signal transmission device according to claim 1, wherein the data length changer increases the length of the data bit field in the communication frames as the duration of the occurrence intervals of the impulse noises is greater.

6. The signal transmission device according to claim 1, wherein the analog detector circuit includes:
    a diode whose anode terminal is connected to the mode separator circuit;
    a capacitor connected between a cathode terminal of the diode and a grounding terminal; and
    a resistor connected in parallel with the capacitor at between the cathode terminal of the diode and the grounding terminal.

* * * * *